United States Patent [19]
Höfle

[11] Patent Number: 5,628,598
[45] Date of Patent: May 13, 1997

[54] ATTACHMENT NUT FOR PROFILED RAILS

[75] Inventor: Siegfried Höfle, Götzis, Austria

[73] Assignee: Hilti Aktiengesellschaft, Furstentum, Liechtenstein

[21] Appl. No.: 527,906

[22] Filed: Sep. 14, 1995

[30] Foreign Application Priority Data

Sep. 16, 1994 [DE] Germany ............... 44 32 996.2

[51] Int. Cl.⁶ ............... F16B 27/00; F16B 37/00
[52] U.S. Cl. ............... 411/85; 411/104; 411/432; 411/970
[58] Field of Search ............... 411/84, 85, 104, 411/432, 552, 907, 908, 970

[56] References Cited

U.S. PATENT DOCUMENTS

| | | |
|---|---|---|
| 1,528,777 | 3/1925 | Marting . |
| 3,493,025 | 2/1970 | La Londe et al. . |
| 4,263,952 | 4/1981 | Kowalski . |
| 4,666,355 | 5/1987 | Stover .................. 411/104 X |
| 4,840,525 | 6/1989 | Rebentisch ................ 411/104 X |
| 5,209,619 | 5/1993 | Rinderer . |
| 5,411,356 | 5/1995 | Travis et al. ................. 411/85 |
| 5,489,173 | 2/1996 | Hofle ................. 411/85 |

OTHER PUBLICATIONS

European Search Report, Number EP 95 810 505.8 dated Apr. 19, 1996.

*Primary Examiner*—Neill R. Wilson
*Attorney, Agent, or Firm*—Anderson Kill & Olick P.C.

[57] ABSTRACT

An attachment nut includes a base member (1) and an elastic retaining insert (6) connected to the base member. The attachment nut serves for fastening components (18), for instance pipe members, to a C-shaped profiled rail (15). The retaining insert (6) has locking tabs located diametrically opposite one another. The tabs can be pivoted about an axis into a slot-like opening in the profiled rail (15) to prevent the turning of the attachment nut. Each locking tab has a projecting lug for effecting the manual turning of the attachment nut within the profiled rail (15).

6 Claims, 3 Drawing Sheets

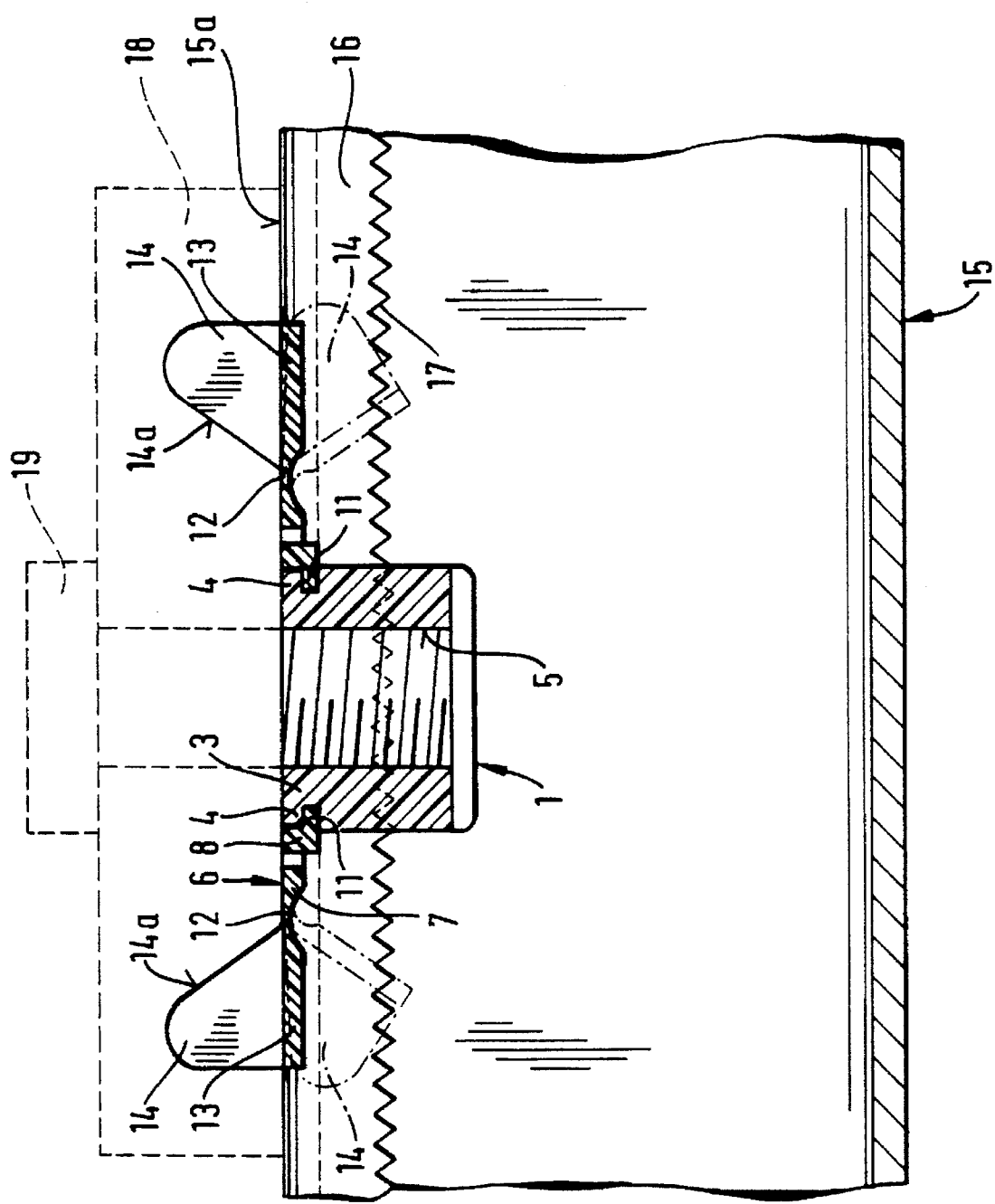

1

ATTACHMENT NUT FOR PROFILED RAILS

BACKGROUND OF THE INVENTION

The present invention is directed to an attachment nut formed of a base member and an elastic retaining insert connected to the base member. The base member has a means for engaging a force applying member and a first dimension extending generally perpendicularly of a second dimension.

An attachment nut of the above-described type is disclosed in U.S. Pat. No. 3,493,024 and serves for securing components to profiled rails where the rail is essentially C-shaped in cross-section. Two legs of the profiled rail, extending parallel to one another, extend into the interior of the rail. The base member is located within the profiled rail and in the preassembled state is axially displaceable within the rail. A retaining insert connected to the base member abuts an outside surface of the profiled rail in the region of a slot-like opening bounded by the two legs.

The base member has an out of round outside shape, whereby the smallest dimension of the outside shape is smaller than the width of the slot-like opening measured perpendicularly to the longitudinal extent of the profiled rail. The base member has a central throughbore with means in the form of an internal thread for engaging a force applying member and two toothed sections or regions extending parallel to one another which cooperate with the free ends of the legs when the attachment nut is inserted into the profiled rail. After this insertion, the basic member can be turned through 90° into its preassembly position.

The retaining insert has a central first region in axially fixed connection with the base member and an elastic collar-like second region abutting the outside surface of the profiled rail in the region of the slot-like opening. The retaining insert has a central passage of essentially the same size as the diameter of the throughbore in the base member or of a shank of a clamping screw which extends through the central passage of the retaining insert into the central throughbore of the base member for securing a component to the profiled rail.

This known attachment nut has the disadvantage that it is difficult to manually turn the attachment nut for its preassembly in the profiled rail, since the attachment nut is difficult to grip. There is another disadvantage in that the attachment nut tends to turn when a clamping screw is tightened in the through bore, so that the nut detaches itself from the preassembled position whereby the base member no longer rests against the free ends of the legs of the profiled rail.

SUMMARY OF THE INVENTION

The primary object of the present invention is to provide an attachment nut which can be easily turned manually when it is inserted in the profiled rail, which does not turn together with the clamping screw when the screw is tightened, and can be manufactured economically.

In accordance with the present invention, by providing the retaining insert with locking tabs located diametrically opposite one another, with the tabs being capable of pivoting around a pivot axis extending parallel to the longer dimension of the base member and by forming the locking tabs of approximately the same dimension as the smaller dimension of the base member.

The locking tabs are formed on the retaining insert and provide an engagement surface which enlarges the retaining insert affording easier manual gripping and thus easier turning of the retaining insert along with base member. If the locking tabs are pivoted into the slot-like opening in the profiled rail, they form security against turning the attachment nut. To achieve a self-acting pivoting of the locking tabs around the pivot axis into the slot-like opening in the profiled rail, when a component is placed upon the profiled rail, the surfaces of the locking tabs facing outwardly away from the base member comprise outwardly projecting lugs. These lugs projecting beyond the surface of the retaining insert directed away from the base member, and form engagement faces which can be gripped manually thus enabling a more convenient turning of the attachment nut.

Preferably, the retaining insert has a thinner wall thickness in the region of the pivot axis for affording easy pivoting of the locking tabs. The reduction of the wall thickness is achieved by a recess extending in the long direction of the pivot axis in the surface of the retaining insert facing the base member.

The wall thickness of the retaining insert is reduced in the longer direction of the base member towards the free end of the insert, so that the retaining insert does not form an intermediate layer between the component and the profiled rail when the component is fastened to the profiled rail. The wall thickness tapers to zero with the tapering effected from the side of the retaining element facing the base member to the opposite side or face. For example, the tapered surface can be matched to the mouth of the slot-like opening, whereby the wall thickness of the retaining member is constant across the slot-like opening and tapers if continued beyond the slot-like opening.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWINGS

FIG. 3 is a sectional view taken along the line III—III in FIG. 2 displaying the base member and the retaining insert fixed to the profiled rail.

DETAILED DESCRIPTION OF THE INVENTION

Figure 1:
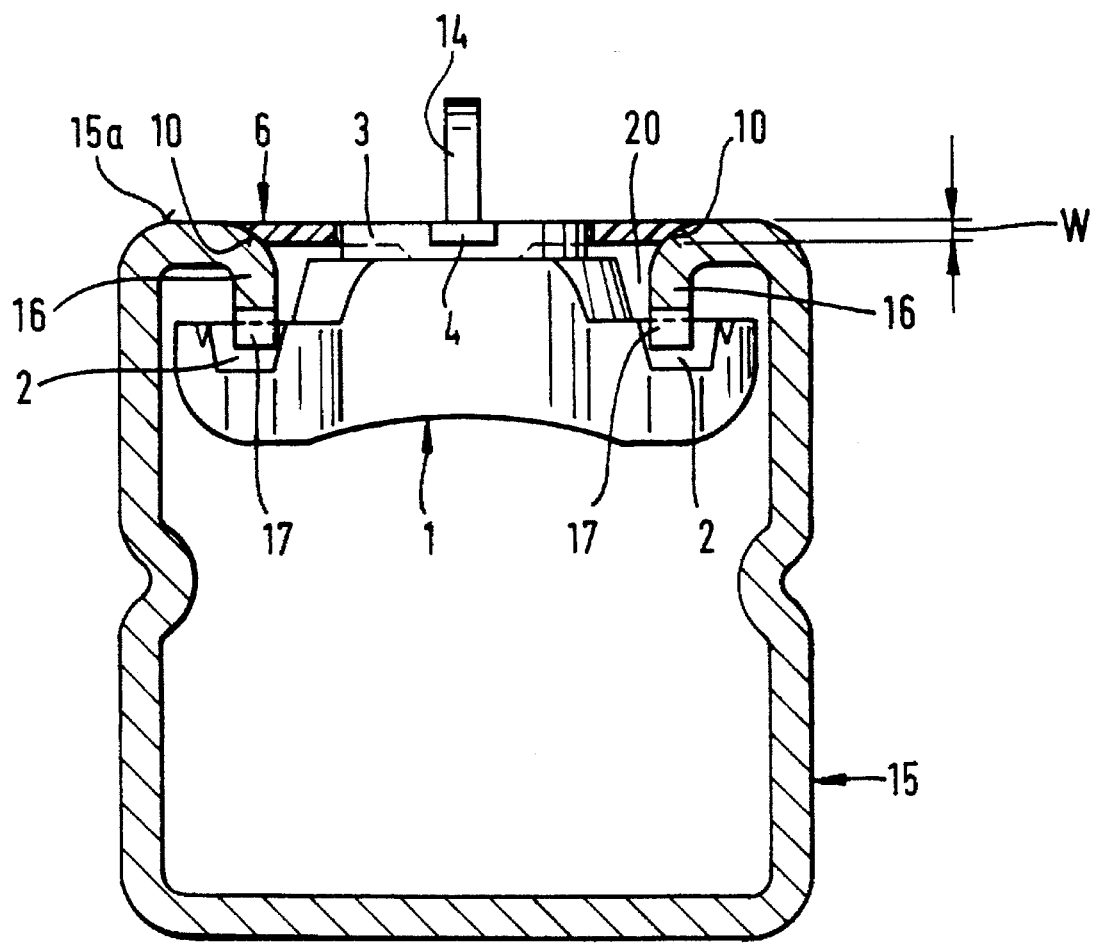
FIG. 1 is a end view, partly in section, of an attachment nut and retaining insert fitted in a profiled rail.
Figure 2:
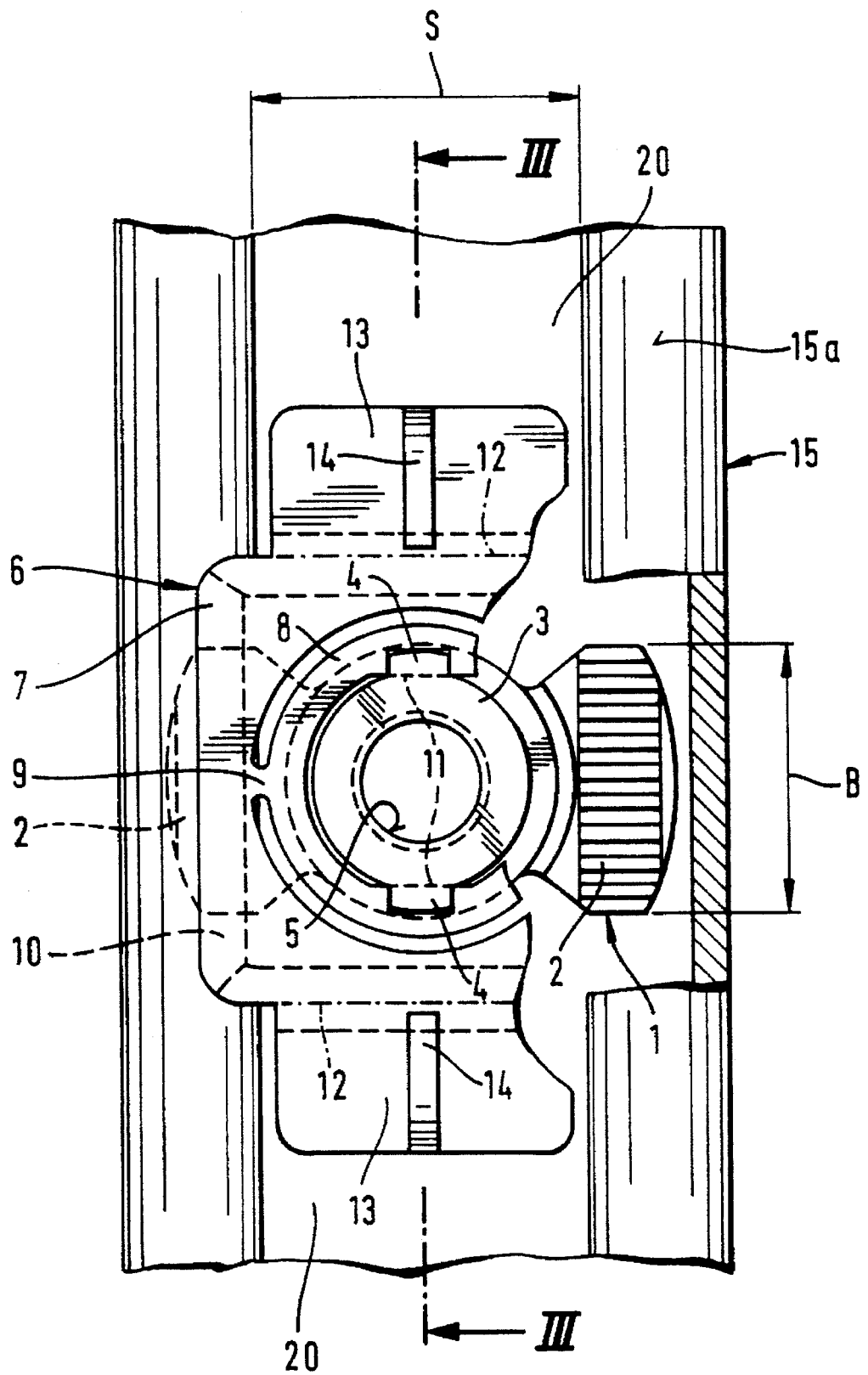
FIG. 2 is a plan view, partly in section, of the profiled rail, the retaining insert and the base member as shown in FIG. 1.

In the FIGS. 1–3 an attachment nut is shown formed of a base member 1 and an elastic retaining insert 6 connected to the base member. Base member 1 has an out of round head containing a central throughbore with an internal thread 5 and two toothed sections 2 extending parallel to one another on opposite sides of the throughbore. A cylindrical attachment 3 is coaxial with the throughbore and forms a seat for the axially flexural retaining insert 6. The cylindrical attachment 3 forms hooks 4 which serve for the axial non-rotational securement of the retaining insert 6 on the base member 1. Stop edges 11 on the retaining insert 6 grip the hooks 4. Stop edges 11 form part of an internal ring 8 disposed in the same plane as an external ring 7 surrounding the internal ring. External ring 7 is elastically connected with the internal ring 8 by two connecting webs 9 located diametrically opposite one another, note FIG. 2. The hooks 4 and stop edges 11 are located diametrically opposite one another as are the connecting webs 9, however, the hooks and the stop edges are spaced angularly apart by 90° from the connecting webs 9.

As can be noted in FIG. 1, the wall thickness W of the external ring 7 tapers toward the free edge of the external ring on at least two sides located diametrically opposite one another. The taper 10 along the edges of the external ring are shaped so that the surface of the retaining insert 6 facing the base member 1 tapers outwardly to zero thickness at the surface facing away from the base member 1.

As can be seen in FIG. 2, two locking tabs 13 are located diametrically opposite one another and extend outwardly from two sides of the external ring 7. Outwardly projecting lugs 14 extend from the surface of the locking tabs 13 located remotely from the base member 1 and enable easier manual turning of the base member along with the axially flexural retaining insert 6. Surface profiling of the lugs 14 affords for easier gripping. The width of the locking tabs 13 extends parallel to the larger dimension of the base member 1 and is smaller than the width S of a slot-like opening 20 in a profiled rail 15 in which the attachment member is secured. The locking tabs 13 can be pivoted about a pivot axis 12 extending parallel to the larger dimension of the base member 1, that is the dimension extending transversely of the slot-like opening 20 in FIG. 2. To provide the pivotal movement of the tabs 13, the retaining insert has semi-circularly shaped recesses extending along the pivot axis 12 and the recesses are located in the surface of the external ring 7 facing the base member 1.

The attachment nut of the invention serves, for instance, for fastening parts or components 18, such as pipelines, at the profiled rail 7 having a C-shaped cross-section. As mentioned above, the profiled rail 15 has a slot-like opening 20 extending in its long direction, that is, transversely of the larger dimension of the retaining insert 6. The width S of the slot-like opening 20 is bounded by two laterally spaced legs 16 which extend into the profiled rail and are parallel with one another. The free ends of the legs 16 have a tooth-like profile, note FIG. 3, which matches the toothed sections 2 on the base member 1.

Initially, if the base member 1 having a width B is placed together with the retaining insert 6 through the slot-like opening 20 in the profiled rail 15 and then is turned through 90°, to the position shown in FIG. 2, the attachment nut is in a preassembled position, as displayed in FIGS. 1–3. The locking tabs 13 are pressed slightly towards the top of the rounded-off entry or mouth of the slot-like opening 20, so that the locking tabs 13 slide along the outside surface of the profiled rail 15 while the attachment nut is being turned. During such turning, entry chamfers or bevels located on the base member 1 contact the free ends of the legs 16 of the profiled rail 15 in the region of the toothed sections 2. The base member 1 and the internal ring 8 are moved axially away or inwardly relative to the rail due to the entry chamfers away from the external ring 7 of the retaining insert 6. Such movement causes a prestress of the retaining insert 6. When the position of the attachment nut shown in FIGS. 1–3 is reached, the toothed sections 2 of the base member 1 engage in the toothed-shaped profiled sections 17 at the free ends of the legs 16 of the profiled rail 15. When the interengagement of the toothed sections takes place, an axial displacement of the base member 1 occurs in the opposite direction, that is the upward direction as viewed in FIG. 1, by at least the height of the teeth in the toothed profile. In this position, the retaining insert 6 is axially prestressed. As shown in FIG. 1, the tapers 10 on the edges of the external ring 7 of the retaining insert 6 bear against the entry or mouth section of the slot-like opening 20 so that the surface of the retaining insert 6 facing away from the base member 1 does not project outwardly from the outer surface of the profiled rail 15 or does so only slightly.

After the preassembly of the attachment nut on the profiled rail as shown in FIGS. 1–3, a component 18 can be placed on the profiled rail 15, as shown in phantom in FIG. 3, wherein a stop face 14a of the lugs 14 of the retaining insert 6 comes into contact with the lower surface of the component 18. Note in FIG. 3 that the displaced location of the lugs 14 with the stop faces 14a are shown in phantom. Accordingly, the locking tabs 13 along with the lugs 14 are bent around the pivot axis 12 into the slot-like opening 20 in the profiled rail 15 until the stop faces 14a are aligned parallel to the surface 15a of the profiled rail. Due to the inwardly pivoted position of the locking tabs 13, the attachment nut does not turn when an attachment member 19, shown in phantom in FIG. 3, is tightened. The attachment element 19 is a clamping screw engaged in the internal thread 15 of the base member 1.

While specific embodiments of the invention have been shown and described in detail to illustrate the inventive principles, it will be understood that the invention may be embodied otherwise without departing from such principles.

I claim:

1. An attachment nut includes a base member (1) and an elastic retaining insert (6) connected to said base member, said base member (1) comprises means for engaging a force applying member, said base member having a first dimension and a second dimension extending generally perpendicularly of and being smaller than said first dimension, said means having an axis extending transversely of the said first and second dimensions, said retaining insert (6) extends transversely of the axis of said means and is connected to a first end of said base member, said retaining insert comprises locking tabs (13) located diametrically opposite one another and each being pivotally displaceable about a pivot axis (12) extending parallel to said first dimension, and said tabs having a first dimension extending parallel to the first dimension of the said base member and the first dimension of the said retaining insert (6) being approximately equal to the second dimension of said base member (1), and the surfaces of said locking tabs (13) facing away from said base member (1) each comprise an outwardly projecting lug (14).

2. Attachment nut, as set forth in claim 1, wherein said retaining insert (6) has a reduced wall thickness W in the region of and extending along the pivot axis (12).

3. Attachment nut, as set forth in claim 1, wherein the wall thickness W of the retaining insert (6) tapers to an edge thereof extending transversely of the first dimension of said base member (1).

4. An attachment member to be secured in an elongated slot-like opening (20) of a profiled rail (15) includes a base member (1) having an axis and an elastic retaining insert (6) connected to one end of said base member and extending transversely of the axis thereof, said attachment nut has a preassembled position within said profiled rail (15), said base member (1) comprises means for engaging a force applying member and having a first dimension extending transversely of the elongated slot-like opening in the profiled rail and a second dimension extending generally perpendicularly of and being smaller than said first dimension, the axis of said means extends perpendicularly of said first and second dimensions, said retaining insert (6) extends transversely of the axis of said means and is connected to the one end of said base member, said retaining insert (6) comprises locking tabs (13) located diametrically opposite one another and each being pivotal about a pivot axis (12) extending parallel to said first dimension, and said tabs having a dimension extending parallel to the first dimension of said base member and the first dimension of said retaining member (6) being approximately equal to the second dimension of the said base member (1), and said locking tabs (13) each having a surface facing away from said base member (1) with a lug (14) projecting outwardly from said surface of the locking tabs.

5. An attachment member, as set forth in claim 4, wherein said retaining insert has a reduced wall thickness W in and extending along the region of said pivot axis (12).

6. An attachment member, as set forth in claim 4, wherein the wall thickness W of said retaining insert diminishes to an edge of said retaining insert extending transversely of the first dimension of said base member (1).

* * * * *